(12) United States Patent
Iwamoto (10) Patent No.: US 11,398,664 B2
(45) Date of Patent: Jul. 26, 2022

(54) BATTERY AND BATTERY SYSTEM (71) Applicant: Panasonic Intellectual Property Management Co., Ltd., Osaka (JP)

(72) Inventor: Kazuya Iwamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 100 days.

(21) Appl. No.: 16/372,513

(22) Filed: Apr. 2, 2019

(65) Prior Publication Data
US 2019/0348662 A1 Nov. 14, 2019

(30) Foreign Application Priority Data

May 9, 2018 (JP) .............................. JP2018-090598

(51) Int. Cl.
*H01M 50/543* (2021.01)
*H01M 10/48* (2006.01)

(52) U.S. Cl.
CPC ......... *H01M 50/543* (2021.01); *H01M 10/48* (2013.01)

(58) Field of Classification Search
CPC .... H01M 2/30; H01M 10/48; H01M 10/6553; H01M 50/543; H05K 7/005
USPC ........................................................ 429/179
See application file for complete search history.

(56) References Cited

U.S. PATENT DOCUMENTS

| 2010/0297478 A1* | 11/2010 | Mashiko | H01M 10/12 429/7 |
| 2016/0021772 A1 | 1/2016 | Nakayama et al. | |
| 2016/0025818 A1* | 1/2016 | Bourilkov | H01M 10/48 429/93 |
| 2018/0277822 A1* | 9/2018 | Minagata | H01G 11/82 |

FOREIGN PATENT DOCUMENTS

| JP | 2004-319362 | 11/2004 |
| JP | 2008-146943 | 6/2008 |
| JP | 2010-205578 | 9/2010 |
| JP | 2011-010446 | 1/2011 |
| JP | 2014-191954 | 10/2014 |
| JP | 2016-018634 | 2/2016 |

* cited by examiner

*Primary Examiner* — Cynthia H Kelly
*Assistant Examiner* — Niara Trant
(74) *Attorney, Agent, or Firm* — Greenblum & Bernstein, P.L.C.

(57) ABSTRACT

A battery includes at least one cell, a case that houses the at least one cell, at least one first charge/discharge terminal that is electrically connected to the at least one cell, and at least one first monitor terminal that is electrically connected to the at least one cell. The at least one first charge/discharge terminal has a protrusion that partially protrudes from a surface of the case. The at least one first monitor terminal has a recess that is partially recessed from the surface of the case.

7 Claims, 4 Drawing Sheets

BATTERY AND BATTERY SYSTEM

BACKGROUND

1. Technical Field

The present disclosure relates to a battery and a battery system.

2. Description of the Related Art

Non-aqueous electrolyte secondary batteries such as lithium-ion secondary batteries are known as batteries. A non-aqueous electrolyte secondary battery includes a power generating element configured by laminating two electrodes, each of which is formed by placing an active material layer is placed on a collector, are laminated with a separator intervening between them.

A feature of non-aqueous electrolyte secondary batteries such as lithium-ion secondary batteries is that they have higher energy density and can operate at a higher voltage than other secondary batteries. Therefore, non-aqueous electrolyte secondary batteries such as lithium-ion secondary batteries are used in information devices such as mobile telephones as secondary butteries that can be easily made lightweight and compact. In recent years, there are increasing demands for using non-aqueous electrolyte secondary batteries in hybrid vehicles and electric vehicles or as large power sources such as being stationary.

When a non-aqueous electrolyte secondary battery is used as a large power source, a plurality of power generating elements are often stored in a single case. In a battery system including a plurality power generating elements, the voltage, temperature, internal pressure, or the like of each power generating element is monitored and controlled to assure a long life and high safety.

A conventional battery known as a battery that can monitor the voltage and the like of a power generating element stored in a case has a charge/discharge terminal used to charge and discharge the power generating element and also has a monitor terminal used to monitor the voltage, temperature, internal pressure, or the like of the power generating element.

In a bipolar secondary buttery disclosed in, for example, Japanese Patent No. 4111043, a power generating element is formed by alternately laminating bipolar electrodes and solid electrolytes. A positive-pole tab and a negative-pole tab that are used to charge and discharge the power generating element are connected to bipolar electrodes located at both end of the power generating element in the lamination direction of the power generating element, one at each end, and voltage detection tabs are connected to bipolar electrodes at other than both ends. The voltage detection tabs are drawn in directions different from the directions in which the positive-pole tab and negative-pole tab are drawn. The positive-pole tab, negative-pole tab, and voltage detection tabs are secured to external terminals.

In a battery pack disclosed in Japanese Unexamined Patent Application Publication No. 2008-146943, a plurality of thin batteries are laminated in their thickness direction and electrode tabs adjacent to each other in the laminating direction are mutually connected so that the plurality of thin batteries are electrically connected in series and/or in parallel. A convex or concave fitting part to which a voltage detection connector fits by being inserted is formed on or in at least one of a plurality of electrode tabs that are adjacent by being overlaid in the lamination direction.

SUMMARY

In one general aspect, the techniques disclosed here feature a battery that includes at least one cell, a case that houses the at least one cell, at least one first charge/discharge terminal that is electrically connected to the at least one cell, and at least one first monitor terminal that is electrically connected to the at least one cell. The at least one first charge/discharge terminal has a protrusion that partially protrudes from a surface of the case. The at least one first monitor terminal has a recess that is partially recessed from the surface of the case.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Prehistory to One Aspect According to the Present Disclosure

A prehistory to one aspect of the present disclosure will be described before embodiments of the present disclosure are described.

In the bipolar secondary buttery disclosed in Japanese Patent No. 4111043, the positive-pole tab and negative-pole tab, which function as charge/discharge terminals, and the voltage detection tabs, which function as monitor terminals, are exposed. This may cause a short circuit between the positive-pole tab or negative-pole tab and a voltage detection tab. Another problem with the bipolar secondary buttery disclosed in Japanese Patent No. 4111043 is that the positive-pole tab, negative-pole tab, and voltage detection tabs are drawn from different sides of the bipolar secondary buttery. This lowers setting efficiency when the bipolar secondary buttery is mounted in a device. In addition, the bipolar secondary buttery disclosed in Japanese Patent No. 4111043 is only intended to monitor inter-cell voltages. There is no countermeasure for a battery container, which is a case in which power generating elements are stored.

In the battery pack disclosed in Japanese Unexamined Patent Application Publication No. 2008-146943, a pair of electrode tabs, which function as charge/discharge terminals, and a voltage detection terminal portion, which functions as monitor terminals, are placed close to each other. Therefore, setting efficiency when the battery pack is mounted in a device is not lowered, unlike the bipolar secondary buttery disclosed in Japanese Patent No. 4111043. However, the battery pack disclosed in Japanese Unexamined Patent Application Publication No. 2008-146943 is problematic in strength because the voltage detection terminal portion is formed by using the collector of the battery. When a voltage detection connector is inserted into the voltage detection terminal portion, therefore, the voltage detection terminal portion may be deformed and a short circuit may occur between the pair of electrode tabs and the voltage detection terminal portion.

The present inventor found that it is possible to attain a battery and the like in which many terminals can be easily disposed and for which the risk that a short circuit occurs between a charge/discharge terminal and a monitor terminal can be reduced by making a countermeasure for a case in which a power generating element is stored. Particularly, the present inventor found that it is possible to attain a battery in which, in spite of charge/discharge terminals and monitor terminals being formed on the same surface of a case, the risk that a short circuit occurs between a charge/discharge terminal and a monitor terminal can be reduced.

The present disclosure includes items described below.

Item 1

A battery according to item 1 in the present disclosure includes at least one cell, a case that houses the at least one cell, at least one first charge/discharge terminal that is electrically connected to the at least one cell, and at least one first monitor terminal that is electrically connected to the at least one cell. The at least one first charge/discharge terminal has a protrusion that partially protrudes from a surface of the case. The at least one first monitor terminal has a recess that is partially recessed from the surface of the case.

In the battery described in item 1 in the present disclosure, the at least one first charge/discharge terminal may be connected to the at least one cell directly or through at least one respective lead wire. The at least one first monitor terminal may be connected to the at least one cell directly or through at least one respective lead wire.

Item 2

In the battery described in item 1 in the present disclosure, the case may have a plurality of faces, and the at least one first charge/discharge terminal and the at least one first monitor terminal may be disposed on the same face of the plurality of faces.

Item 3

In the battery described in item 2 in the present disclosure: the at least one first charge/discharge terminal may include two first charge/discharge terminals; the at least one first monitor terminal may include a plurality of first monitor terminals; and the plurality of first monitor terminals may be arranged in one row between the two first charge/discharge terminals.

Item 4

A battery system according to item 4 in the present disclosure includes the battery described in any one of items 1 to 3 in the present disclosure, a second charge/discharge terminal configured to be electrically connected to the first charge/discharge terminal, and a second monitor terminal configured to be electrically connected to the first monitor terminal. A first connection form in which the first charge/discharge terminal and the second charge/discharge terminal are interconnected differs from a second connection form in which the first monitor terminal and the second monitor terminal are interconnected.

In the battery system described in item 4 in the present disclosure, the second charge/discharge terminal may be configured to be directly connected to the first charge/discharge terminal, and the second monitor terminal may be configured to be directly connected to the first monitor terminal.

Item 5

In the battery system described in item 4 in the present disclosure, a contact area between the first charge/discharge terminal and the second charge/discharge terminal in the first connection form may be larger than a contact area between the first monitor terminal and the second monitor terminal in the second connection form.

Item 6

In the battery system described in item 5 in the present disclosure: the second charge/discharge terminal may have a second recess; and in the first connection form, the protrusion of the first charge/discharge terminal may be fit to the second recess of the second charge/discharge terminal, and an end of the convex shape of the first charge/discharge terminal may be in contact with part of the second charge/discharge terminal.

Item 7

The battery system described in any one of items 4 to 6 in the present disclosure may further have a holder that holds the second charge/discharge terminal and the second monitor terminal; the second charge/discharge terminal may have a second recess that is partially recessed from a surface of the holder; the second monitor terminal may have a second protrusion that partially protrudes from the surface of the holder.

Item 8

In the battery system described in item 7 in the present disclosure, the holder may include a spring placed in the holder, and the second monitor terminal may be configured to move when the spring extends or contracts.

Embodiments of the present disclosure will be described below with reference to the drawings. Embodiments described below are just specific examples of the present disclosure. Shapes, materials, constituent elements, positions at which these constituent elements are placed, connection forms, and the like indicated in the embodiments below are just examples, and are not intended to restrict the present disclosure. Of the constituent elements in the embodiments below, therefore, constituent elements not described in independent claims, each of which indicates the topmost concept of the present disclosure, will be described as arbitrary constituent elements.

Each drawing is a schematic drawing and is not necessarily drawn in a rigorous manner. In all drawings, the essentially same constituent elements are denoted by the same numerals and repeated descriptions will be omitted or simplified.

First Embodiment

Figure 1:
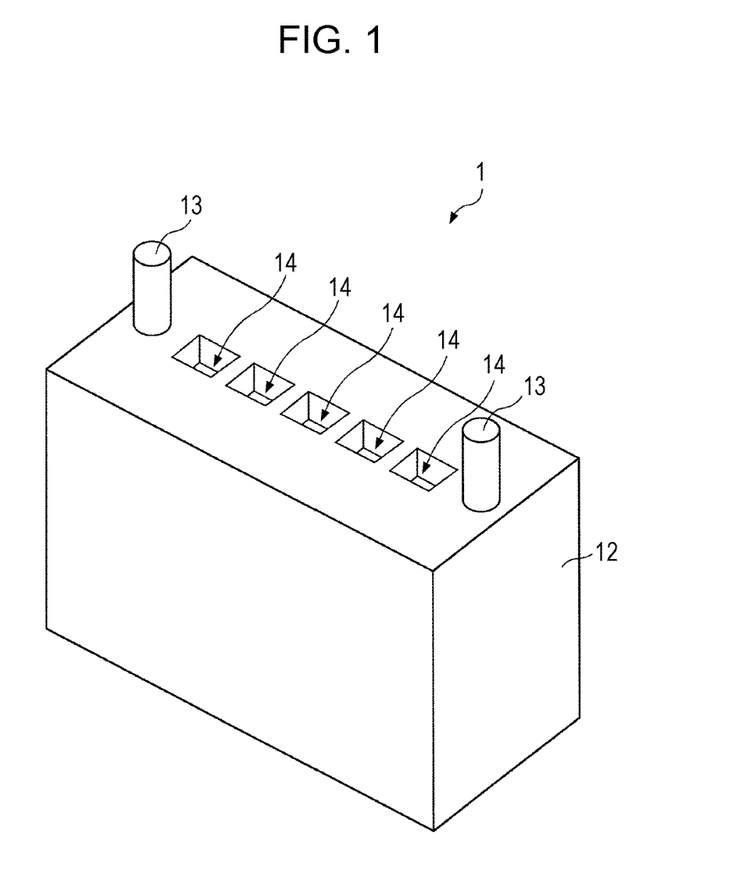
FIG. 1 is a perspective view illustrating an example of the outside shape of a battery according to an embodiment.
Figure 2A:
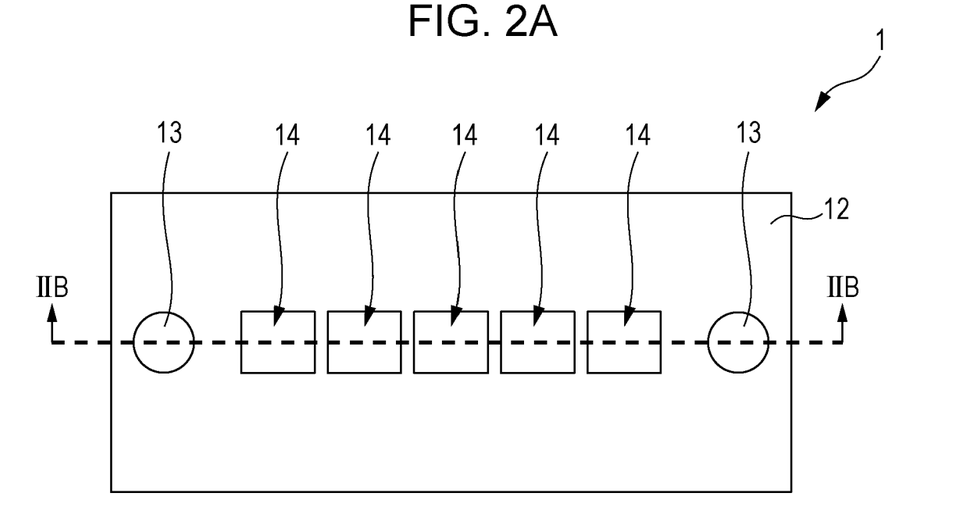
FIG. 2A is a top view of the battery according to an embodiment.

First, a battery 1 according to a first embodiment will be described with reference to FIGS. 1, 2A, and 2B. FIG. 1 is a perspective view illustrating an example of the outside shape of the battery 1 according to this embodiment. FIG. 2A is a top view of the battery 1 and FIG. 2B is a cross-sectional view of the battery 1 taken along line IIB-IIB in FIG. 2A.

Figure 2B:
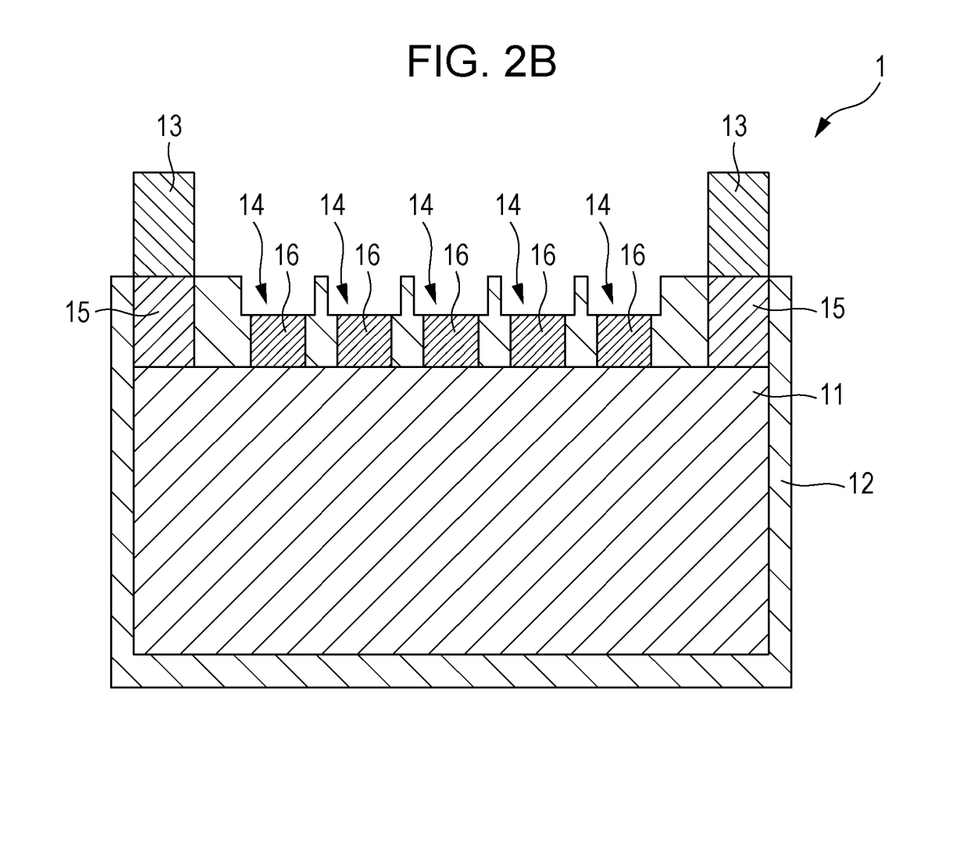
FIG. 2B is a cross-sectional view of the battery according to an embodiment as taken along line IIB-IIB in FIG. 2A.

As illustrated in FIGS. 1, 2A, and 2B, the battery 1 in this embodiment has a power generating element 11, a case 12 that stores the power generating element 11, first charge/discharge terminals 13 that are electrically connected to the power generating element 11, and first monitor terminals 14 that are electrically connected to the power generating element 11. The power generating element 11 is an example of at least one cell.

The power generating element 11 includes, for example, a positive pole in which a positive-pole active material layer is placed on a positive-pole collector, a negative pole in which a negative-pole active material layer is placed on a negative-pole collector, and a separator intervening between the positive pole and the negative pole. The power generating element 11 may be stored separately in an external body.

The power generating element 11 may be a single cell or may be a battery pack in which a plurality of cells are combined. A cell may be a primary battery or a secondary battery. When a cell is a secondary battery, the cell may be, for example, an all-solid-state battery such as an all-solid-state lithium-ion secondary battery, or may be a non-aqueous electrolyte secondary battery such as a lithium-ion secondary battery.

When the power generating element 11 is a battery pack, a plurality of cells may be connected in parallel or in series to form the battery pack. In this case, the electrodes of the cell and the first charge/discharge terminals 13 may be electrically interconnected or the electrodes of the cell and the first monitor terminals 14 may be electrically interconnected. In a case in which a plurality of first monitor terminals 14 are provided as in this embodiment, the electrodes of a plurality of cells and the plurality of first monitor terminals 14 may be interconnected on a one-to-one basis.

The case 12 is a container that stores the power generating element 11. The case 12 has a rigid container having a predetermined shape. In this embodiment, the outside shape of the case 12 is a substantially rectangular parallelepiped. The case 12 may be made of a resin or a metal. If a plurality of power generating elements 11 are placed, the case 12 stores the plurality of power generating elements 11.

The first charge/discharge terminal 13 is a terminal that charges and/or discharges the power generating element 11. That is, the first charge/discharge terminal 13 is a structural body that applies electric power to the power generating element 11 and retrieves electric power from the power generating element 11.

The first charge/discharge terminal 13 may be connected directly to the power generating element 11. However, the first charge/discharge terminal 13 may be connected to the power generating element 11 through, for example, a lead wire 15 as in this embodiment. Since the first charge/discharge terminal 13 and power generating element 11 are electrically interconnected, electric power can be applied to the power generating element 11 through the first charge/discharge terminal 13 and electric power can be retrieved from the power generating element 11 through the first charge/discharge terminal 13.

The first charge/discharge terminal 13 has a concave shape that protrudes from part of a surface of the case 12. Specifically, the first charge/discharge terminal 13 is a rod-like male terminal made of a conductive material such as a metal. As an example, the shape of the first charge/discharge terminal 13 is cylindrical columnar. However, there is no particular limitation on the shape of the first charge/discharge terminal 13 if it has a convex shape. In this embodiment, a pair of first charge/discharge terminals 13 is provided. That is, two first charge/discharge terminals 13 are attached to the case 12.

The first monitor terminal 14 is a terminal that detects the state of the power generating element 11. The first monitor terminal 14 is a structural body that, for example, monitors the operational state and the like of the power generating element 11. More specifically, the first monitor terminal 14 detects the voltage, temperature, or pressure of a unit cell stored in the power generating element 11 or a gas or the like present in the unit cell and retrieves the detection result as a monitor signal. What is monitored by the first monitor terminal 14 is not limited to these. Anything that can be sensed in relation to the power generating element 11 can be monitored.

The first monitor terminal 14 may be connected directly to the power generating element 11. However, the first monitor terminal 14 may be connected to the power generating element 11 through, for example, a lead wire 16 as in this embodiment. Since the first monitor terminal 14 and power generating element 11 are electrically interconnected, the operational state and the like of the power generating element 11 can be monitored through the first monitor terminal 14. If, for example, the first monitor terminal 14 is a voltage detection terminal that monitors the voltage of the power generating element 11, the voltage of the power generating element 11 is detected by the first monitor terminal 14 as a monitor signal.

The first monitor terminal 14 has a concave shape recessed in part of a surface of the case 12. Specifically, the first monitor terminal 14 is a female terminal in a concave shape formed in part of the case 12. As an example, the shape of the first monitor terminal 14 is a square hole. However, there is no particular limitation on the shape of the first monitor terminal 14 if it has a concave shape. Besides a concave part formed in the case 12, the first monitor terminal 14 may have a conductive member provided at the bottom of the concave part, the conductive member being made of a conductive material such as a metal.

In this embodiment, the battery 1 has a plurality of first monitor terminals 14 as described above. Specifically, five first monitor terminals 14 are included in the case 12. In this case, the plurality of first monitor terminals 14 are connected to a plurality of cells on a one-to-one basis as described above. However, each of the plurality of first monitor terminals 14 may monitor one of the voltage, temperature, pressure, and the like of one power generating element 11.

The first charge/discharge terminals 13 and first monitor terminals 14 are disposed on the same surface of the case 12. In this embodiment, the first charge/discharge terminals 13 and first monitor terminals 14 are disposed on the upper surface of the case 12. The five first monitor terminals 14 are arranged in a row between a pair of first charge/discharge terminals 13. Although, in this embodiment, the first charge/discharge terminals 13 and first monitor terminal 14 are arranged in a row, this is not a limitation. They may be arranged in a plurality of rows.

In the battery 1, described above, according to this embodiment, the first charge/discharge terminal 13 has a convex shape that protrudes from part of a surface of the case 12 and the first monitor terminal 14 has a concave shape recessed in part of the surface of the case 12.

In this structure, an insulation distance is assured between the first charge/discharge terminal 13 and the first monitor terminal 14, so it is possible to reduce the risk that a short circuit occurs between the first charge/discharge terminal 13 and the first monitor terminal 14.

More specifically, if both the first charge/discharge terminal 13 and first monitor terminal 14 have a convex shape, when a cable or the like is connected to each of the first charge/discharge terminal 13 and first monitor terminal 14, the risk that a short circuit occurs between the first charge/discharge terminal 13 and the first monitor terminal 14 is raised. By contrast, if both the first charge/discharge terminal 13 and first monitor terminal 14 have a concave shape, a structure is needed in which the first charge/discharge terminal 13, which requires a particularly large shape to cause a current to flow, is recessed in the power generating element 11, lowering the volume energy density. If, however, the first charge/discharge terminal 13 has a convex shape and the first monitor terminal 14 has a concave shape as in the battery 1 according to this embodiment, it is possible to reduce the risk that a short circuit occurs between the first charge/discharge terminal 13 and first monitor terminal 14 without lowering the volume energy density of the battery 1. Since there is no need to cause a current to flow in the first monitor terminal 14 and the shape of the first monitor terminal 14 thereby does not need to be enlarged, even if the first monitor terminal 14 has a concave shape, the volume energy density is not lowered.

Since the risk that a short circuit occurs between the first charge/discharge terminal 13 and first monitor terminal 14 is lowered, it becomes possible to dispose a plurality of first charge/discharge terminals 13 and a plurality of first monitor terminals 14 on the same surface of the case 12 as in this embodiment. That is, even if terminals composed of a plurality of first charge/discharge terminals 13 and a plurality of first monitor terminals 14 are disposed on the same surface of the case 12, the risk that the terminals suffer from a short circuit is reduced. When terminals composed of a plurality of first charge/discharge terminals 13 and a plurality of first monitor terminals 14 are disposed on the same surface of the case 12 as described above, the terminals can be easily provided in the case 12.

Specifically, in the battery 1 in this embodiment, a pair of first charge/discharge terminals 13 and a plurality of first monitor terminals 14 arranged in a row between the pair of first charge/discharge terminals 13 are provided in the case 12.

Thus, it is possible to reduce the risk that a short circuit occurs between the pair of first charge/discharge terminals 13 and to connect an external connection member such as a cable to each of the first charge/discharge terminals 13 and first monitor terminals 14.

In addition, since the first charge/discharge terminal 13 and first monitor terminal 14 have different shapes, the first charge/discharge terminal 13 and first monitor terminal 14 can be easily distinguished from each other. Therefore, it is also possible to restrain an external connection member such a cable from being connected to the wrong first charge/discharge terminal 13 or first monitor terminal 14.

Second Embodiment

Figure 3:
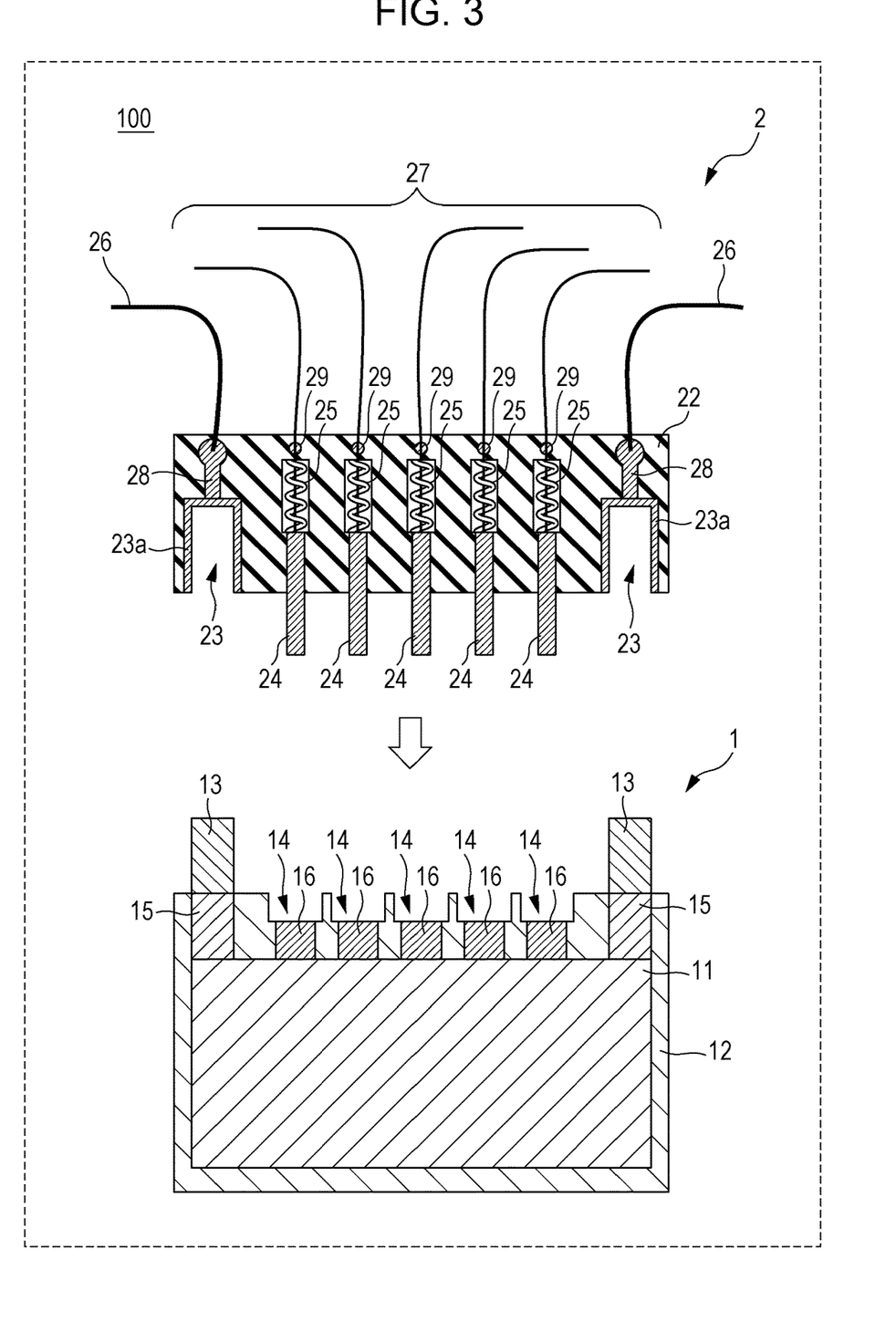
FIG. 3 illustrates an example of the outline shape of a battery system according to an embodiment.
Figure 4:
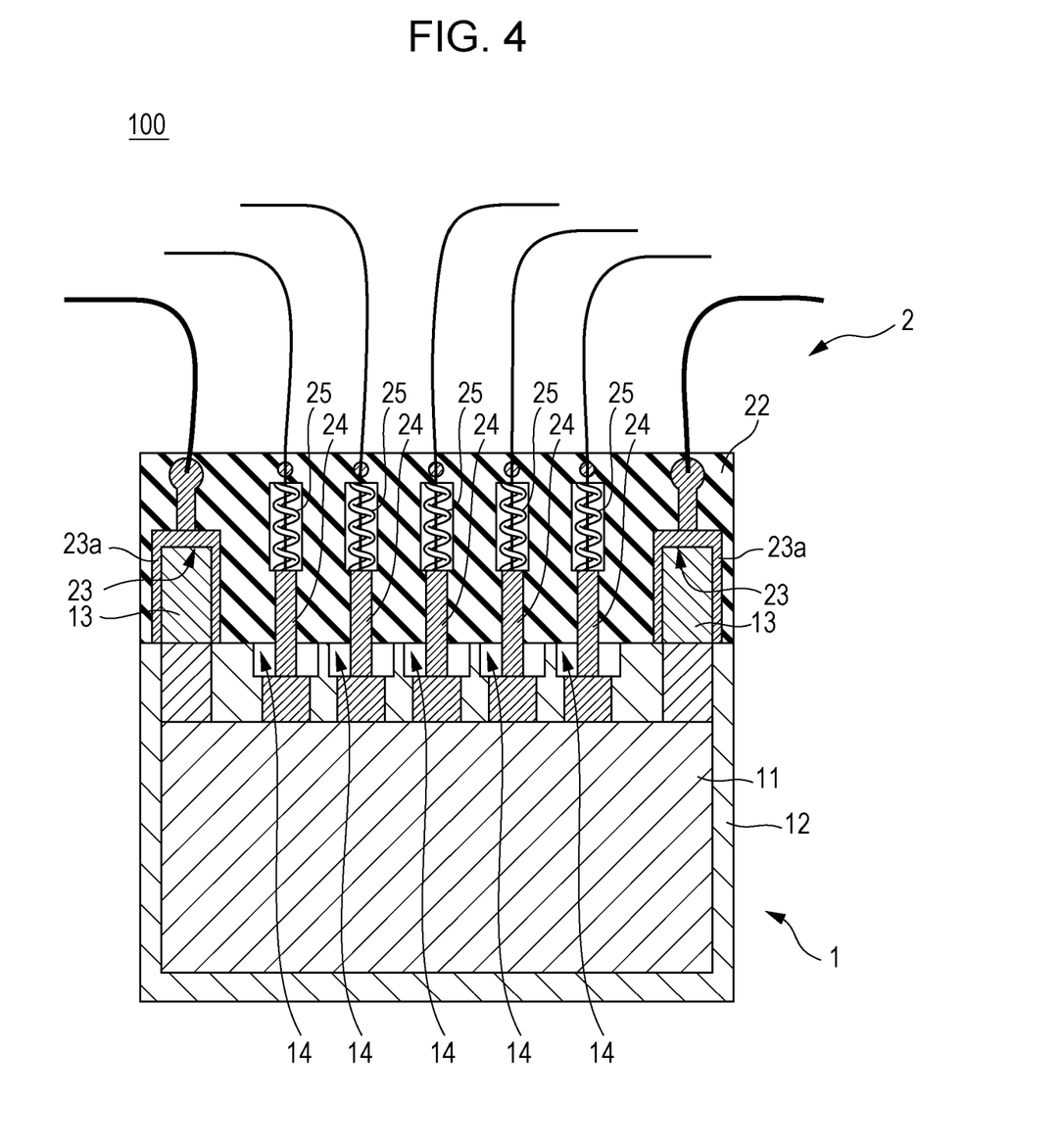
FIG. 4 illustrates an example of a state in which the battery and an external connecting member in the battery system according to an embodiment are interconnected.

Next, a battery system 100 according to a second embodiment will be described with reference to FIGS. 3 and 4. FIG. 3 illustrates an example of the outline shape of the battery system 100 according to this embodiment, illustrating a state before an external connection member 2 and the battery 1 are interconnected. FIG. 4 illustrates an example of a state in which the battery 1 and external connection member 2 in the battery system 100 are interconnected.

As illustrated in FIGS. 3 and 4, the battery system 100 in this embodiment has the battery 1 in the first embodiment described above and the external connection member 2 connected to the battery 1.

When the external connection member 2 is attached to the battery 1, the external connection member 2 is connected to the battery 1. The external connection member 2 is mechanically and electrically connected to the battery 1. The external connection member 2 may be, for example, a connection plug or a connection lid.

The external connection member 2 has a holder 22, second charge/discharge terminals 23 connected to the first charge/discharge terminals 13, and second monitor terminal 24 connected to the first monitor terminals 14. The second charge/discharge terminals 23 and second monitor terminals 24 are held by the holder 22. The holder 22 is made of, for example, an insulating resin material. However, the holder 22 may be made of a metal material. If the holder 22 is made of a metal material, it suffices to provide a structure that insulates the second charge/discharge terminals 23 and second monitor terminals 24 from each other.

The second charge/discharge terminal 23 is a terminal that is mechanically and electrically connected to the first charge/discharge terminal 13. The second charge/discharge terminal 23 has a concave shape recessed in part of the holder 22. When the second charge/discharge terminal 23 fits to the first charge/discharge terminal 13, the second charge/discharge terminal 23 is mechanically connected to the first charge/discharge terminal 13. Specifically, the second charge/discharge terminal 23 is a female terminal in a concave shape formed in part of the holder 22. As an example, the shape of the second charge/discharge terminal 23 is a cylindrical hole. However, there is no particular limitation on the shape of the second charge/discharge terminal 23 if the second charge/discharge terminal 23 can store the first charge/discharge terminal 13.

Since the second charge/discharge terminal 23 is electrically connected to the first charge/discharge terminal 13, the second charge/discharge terminal 23, which fits to the first charge/discharge terminal 13, may have a metal film 23a formed on the entire inner walls of a concave part forming the second charge/discharge terminal 23 to enlarge its area on which the second charge/discharge terminal 23 comes into contact with the first charge/discharge terminal 13. The metal film 23a is made of, for example, copper or aluminum.

As many second charge/discharge terminals 23 as there are first charge/discharge terminals 13 are provided. Specifically, two second charge/discharge terminals 23 are formed in the holder 22.

The second monitor terminal 24 is a terminal that is mechanically and electrically connected to the first monitor terminal 14. The second monitor terminal 24 has a convex shape that protrudes from part of the holder 22. Specifically, the second monitor terminal 24 is a rod-like male terminal made of a conductive material such as a metal. As an example, the shape of the second monitor terminal 24 is cylindrical columnar or rectangular columnar. However, there is no particular limitation on the shape of the second monitor terminal 24 if it has a convex shape. When the top of the second monitor terminal 24 comes into contact with the first monitor terminal 14, the second monitor terminal 24 is electrically connected to the first monitor terminal 14.

In this embodiment, springs 25 are placed in the holder 22. The second monitor terminal 24 is structured so that it can move when the relevant spring 25 placed in the holder 22 extends or contracts. Specifically, the spring 25 is placed in space formed at the back end of each of a plurality of second monitor terminals 24. The spring 25 is, for example, a coil spring that is elastically deformed. The spring 25 extends and contracts depending on whether it is pressed or not. When the spring 25 extends or contracts, the second monitor terminal 24 moves in its longitudinal direction. An amount by which the second monitor terminal 24 protrudes from the holder 22 changes accordingly.

As many second monitor terminals 24 as there are first monitor terminals 14 are provided. Specifically, five second monitor terminals 24 are provided in the holder 22.

The second charge/discharge terminals 23 and second monitor terminals 24 are disposed on the same surface of the holder 22. In this embodiment, the second charge/discharge terminals 23 and second monitor terminals 24 are disposed on the lower surface of the holder 22, the lower surface being opposite to the upper surface of the case 12 of the battery 1. The placement of the second charge/discharge terminals 23 and second monitor terminal 24 is the same as the placement of the first charge/discharge terminals 13 and first monitor terminals 14. That is, the five second monitor terminals 24 are arranged in a row between a pair of second charge/discharge terminals 23.

The second charge/discharge terminal 23 is electrically connected to a second charge/discharge cable 26 drawn from the holder 22. The second monitor terminal 24 is electrically connected to a second monitor cable 27 drawn from the holder 22. Specifically, the second charge/discharge terminal 23 is joined to the second charge/discharge cable 26 at a second charge/discharge connector 28 provided in the holder 22, and the second monitor terminal 24 is joined to the second monitor cable 27 at a second monitor connector 29 provided in the holder 22. The second charge/discharge terminal 23 and second monitor terminal 24 can be joined by a known method such as crimping, screwing, welding, or brazing.

The external connection member 2 structured as described above is connected to the battery 1 as illustrated in FIG. 4. Specifically, an end of the first charge/discharge terminal 13 in the battery 1 and part of the second charge/discharge terminal 23 in the external connection member 2 are interconnected and part of the first monitor terminal 14 in the battery 1 and an end of the second monitor terminal 24 in the external connection member 2 are interconnected.

Thus, the power generating element 11 in the battery 1 can be charged/discharged and monitored through the external connection member 2. Specifically, electric power can be applied to and retrieved from the power generating element 11 through the second charge/discharge terminal 23 in the external connection member 2 and the first charge/discharge terminal 13 in the battery 1. It is also possible to detect the voltage, temperature, or pressure of the power generating element 11 or a gas or the like present in the power generating element 11 through the second monitor terminal 24 in the external connection member 2 and the first monitor terminal 14 in the battery 1.

In this case, since, in this embodiment, the first charge/discharge terminal 13 has a convex shape, the first monitor terminal 14 has a concave shape, the second charge/discharge terminal 23 has a concave shape, and the second monitor terminal 24 has a convex shape, there is a difference between a first connection form in which the first charge/discharge terminal 13 and second charge/discharge terminal 23 are interconnected and a second connection form in which the first monitor terminal 14 and the second monitor terminal 24 are interconnected.

In this structure, it is possible to implement the battery system 100 so that the battery 1 and external connection member 2 can be interconnected with a lower risk of a short circuit between the first charge/discharge terminal 13 and second charge/discharge terminal 23, which are each a charge/discharge terminal, and the first monitor terminal 14 and second monitor terminal 24, which are each a monitor terminal, without lowering the volume energy density of the battery 1.

A first contact area, which is a contact area between the first charge/discharge terminal 13 and the second charge/discharge terminal 23 in the first connection form, may be larger than a second contact area, which is a contact area between the first monitor terminal 14 and the second monitor terminal 24 in the second connection form.

In this structure, it is possible to implement the battery system 100 so as to be more compact with lower contact resistance between the first charge/discharge terminal 13 and the second charge/discharge terminal 23, which are each a charge/discharge terminal, and between the first monitor terminal 14 and the second monitor terminal 24, which are each a monitor terminal.

The first connection form may be such that there is a fit between the first charge/discharge terminal 13 and the second charge/discharge terminal 23 and an end of the first charge/discharge terminal 13 comes into contact with part of the second charge/discharge terminal 23.

In this structure, it is possible to implement the battery system 100 so as to be more compact with lower contact resistance between the first charge/discharge terminal 13 and the second charge/discharge terminal 23.

In this embodiment, the second charge/discharge terminal 23 and second monitor terminal 24 are held by the holder 22.

In this structure, the second charge/discharge terminal 23 and second monitor terminal 24 can be integrally buried in the holder 22, so when the second charge/discharge terminal 23 is connected to the first charge/discharge terminal 13 and the second monitor terminal 24 is connected to the first monitor terminal 14, it is possible to restrain these terminals from suffering from a short circuit and to simplify a process to interconnect them.

In this embodiment, the second charge/discharge terminal 23 has a concave shape recessed in part of the holder 22 and the second monitor terminal 24 has a convex shape that protrudes from part of the holder 22.

In this structure, it is possible to more reduce the risk that a short circuit occurs between the first charge/discharge terminal 13 and second charge/discharge terminal 23, which are each a charge/discharge terminal, and the first monitor terminal 14 and second monitor terminal 24, which are each a monitor terminal.

In this embodiment, the second monitor terminal 24 is structured so that it can move when the spring 25 placed in the holder 22 extends or contracts.

In this structure, since the second monitor terminal 24 can be pressed against the first monitor terminal 14 with the spring 25, contact resistance between the first monitor terminal 14 and the second monitor terminal 24 can be reduced. That is, although the first monitor terminal 14 can be made compact because it is merely used to retrieve a monitor signal and thereby does not need to be a large terminal, if the first monitor terminal 14 is made compact, the contact area between the first monitor terminal 14 and the second monitor terminal 24 is reduced. If there is no sufficient contact between the first monitor terminal 14 and the second monitor terminal 24 due to the reduced contact area, contact resistance may become very large. In a structure, however, in which the second monitor terminal 24 is pressed against the first monitor terminal 14 with the spring 25, it is possible to restrain contact resistance from becoming large between the first monitor terminal 14 and the second monitor terminal 24 due to an insufficient contact between the first monitor terminal 14 and the second monitor terminal 24. As a result, since the first monitor terminal 14 with a reduced size can be used, a plurality of first monitor terminal 14 can be easily provided in the case 12.

Variation

So far, the battery and battery system in the present disclosure have been described according to the first and second embodiments. However, the present disclosure is not limited to the first and second embodiments described above.

For example, the present disclosure also includes embodiments in which various variations that a person having ordinary skill in the art thinks of are applied to the embodiments described above and embodiments in which constituent elements and functions described in the embodiments described above are arbitrarily combined without departing from the intended scope of the present disclosure.

What is claimed is:

1. A battery comprising:
   at least one cell;
   a case that houses the at least one cell, the case having a plurality of surfaces including a target surface;
   at least one pair of first charge/discharge terminals that is disposed on the target surface of the case and electrically connected to the at least one cell; and
   at least one pair of first monitor terminals that is disposed on the target surface of the case between the at least one pair of first charge/discharge terminals, and electrically connected to the at least one cell,
   wherein the at least one pair of first charge/discharge terminals and the at least one pair of first monitor terminals are linearly aligned along a same axis,
   wherein each of the at least one pair of first charge/discharge terminals has a protrusion that partially protrudes from the target surface of the case,
   wherein each of the at least one pair of first monitor terminals has a recess that is partially recessed from the target surface of the case,
   wherein the at least one pair of first charge/discharge terminals and the at least one pair of first monitor terminals protrudes and recedes, respectively, from a same surface height of the target surface,
   wherein the battery is a non-aqueous battery or an all-solid-state battery, and
   wherein each of the at least one pair of first monitor terminals is configured as a female terminal.

2. The battery according to claim 1, wherein:
   the at least one pair of first charge/discharge terminals comprises two first charge/discharge terminals;
   the at least one pair of first monitor terminals comprises a plurality of first monitor terminals; and
   the plurality of first monitor terminals are arranged in one row between the two first charge/discharge terminals.

3. The battery according to claim 1, wherein the at least one pair of first monitor terminals is disposed adjacent to the at least one pair of first charge/discharge terminals.

4. The battery according to claim 1, wherein the at least one pair of first monitor terminals monitors an operational state of the at least one cell.

5. The battery according to claim 4, wherein the operational state of the at least one cell includes at least one of voltage, temperature and pressure.

6. The battery according to claim 1, wherein the recess in each of the at least one pair of first monitor terminals is exposed to outside of the battery for allowing each of the at least one pair of first monitor terminals to be detachably connected to a terminal outside of the battery.

7. The battery according to claim 1, wherein
   the at least one pair of first monitor terminals is electrically connected to the at least one cell to detect an operating state value of the at least one cell, and
   the recess is partially recessed from the target surface of the case to increase a distance between each of the at least one pair of first charge/discharge terminals and a conductive portion of each of the at least one pair of first monitor terminals for reducing a likelihood of potential short circuiting between the at least one pair of first charge/discharge terminals and the at least one pair of first monitor terminals.

* * * * *